Patented Nov. 12, 1940

2,220,880

UNITED STATES PATENT OFFICE 2,220,880

TEMPERING POROUS ORGANIC PRODUCTS

John M. Baer, Chicago, Ill., assignor to The Guardite Corporation, a corporation of Illinois No Drawing. Application February 19, 1937, Serial No. 126,706

11 Claims. (Cl. 83—28)

This invention relates to the tempering of organic products, and more particularly to the adjustment of the moisture content of cereals such as wheat, corn and the like.

The application of Merriam and Wiles, Patent 2,080,179 issued May 11, 1937, shows the first commercial method of tempering organic products with steam. In that process the organic product is subjected at atmospheric temperatures to a vacuum sufficiently high to produce boiling of contained moisture within the product, and the boiling continued to free the interstices of the product from air or other non-condensible gas. Thereafter steam is introduced and condenses in the products to raise their moisture content. Owing to the freedom from non-condensible gas, the steam has immediate access throughout the body of the material and is uniformly distributed in the product.

Inasmuch as the condensation of 1% of moisture may raise the temperature of the treated article from 30 to 40° F., in the ordinary case the amount of moisture which may be added to articles such as grain is limited because of possible damage to glutens and starches at higher temperatures. This difficulty may of course be overcome in each case by cooling the article and resteaming it.

It has now been discovered that if the exterior of the product is treated with liquid water and the evacuation then commenced, followed by introduction of steam, the liquid water on the outside of wheat, for example, will be distributed uniformly throughout the wheat. In this manner, the moisture content may be raised by far more than the amount which would ordinarily condense within a given temperature range. The mechanism of the operation is not entirely understood, but it would appear that with the capillary channels in the grain substantially entirely free from non-condensible gas, the water which is on the exterior of the grain evaporates under the given temperature and vacuum, and then condenses within the grain, where naturally its vapor pressure would be somewhat lower, owing to the presence of more or less water-absorptive material.

In this manner it is possible to take wheat, for example, having an undesirably low moisture content, add moisture as surface moisture in sufficient amount to produce a final moisture content within the normal milling range of 14 to 16%, depending upon the type of wheat, and by a short treatment transfer all the water uniformly throughout the grain without raising the temperature of the wheat above, say, 120° F.

In carrying out the invention, the product, such as wheat, is charged into a vacuum container adapted to withstand high vacuum, after being moistened with the appropriate amount of surface moisture. In the case of wheat, the wheat is ordinarily washed and then either the desired amount of water may be left on the grain or, after removing the water in the beaters, a predetermined amount may be added.

After the material is in the tank, a vacuum is placed thereon preferably sufficient to boil the water within the grain, and this vacuum is maintained for a sufficient time to clear the inside of the grain of air. Normally, this is controlled by the temperature, the vacuum being broken when the temperature is dropped a few degrees.

When the appropriate point has been reached, steam is admitted to the container, preferably until the temperature has reached a point not in excess of about 120° F., the introduction of the steam being continued until the temperature has reached the desired point throughout the material being treated.

As an example of the process, wheat having an initial temperature of 61° F. and a moisture content of 9.3% was treated with 3.78% surface water and subjected to a vacuum until the temperature had dropped to 57° F. during a period of nine minutes of the evacuation. Steam was then admitted to bring the temperature to 122° F., where it was maintained until the temperature was uniform throughout the mass. At the end of this time the wheat had a moisture content of approximately 14.4%. The steam was admitted to the tank at a temperature of 160° F.

In a similar instance, wheat at 70° F., having a moisture content of 9.4%, was treated with 5% of surface moisture and subjected to a vacuum for 16 minutes, during which time the temperature dropped approximately 5° F. Steam was then admitted to bring the temperature to 122° F., and the final moisture content was approximately 14.6%. In another instance wheat having a moisture content of 9.4% and an initial temperature of 70° F. was subjected to an absolute pressure of 0.7 inches to produce a temperature drop of 4° F., after 6% of surface water had been added. Steam was admitted to raise the temperature to approximately 124° F., and the final water content was approximately 15.0%.

In another instance, wheat showing a tag reading of 9.4, having a temperature of 63° F., was treated with 4.03% surface moisture and subjected to a pressure of about one-half inch absolute until the temperature had fallen to 55° F. Desuperheated steam at 160° F. was then admitted, the evacuation being continued through the lower part of the container for the first portion of the steaming, and continued until the wheat had reached the temperature of approximately 124° F. Wheat sampled from the top, bottom and middle of the container showed a tag reading of 14.0 after cooling.

In the case of corn, higher moisture contents are usually employed. As an example of the process, as applied to corn, this grain, having a moisture content of 14.4, a temperature of 67° F., was treated with 4% of surface moisture and subjected to a vacuum sufficiently long to drop the temperature about 16° F., and the steam admitted to bring the temperature to 122° F., where it was maintained for about 30 minutes. The final moisture content was 19.4%. In a similar instance, with 4% of water added to corn having an initial moisture content of 14.8%, the final product had a moisture content of about 19%.

The following table shows the effect of progressive increments of surface water on Quaker Oats Company blend No. 1, 50% Iowa wheat, treated in each case to 20 minutes exposure to steam while the product was at a temperature of approximately 122° F. column I shows the initial moisture content; column II, the percent of surface water added; column III shows the average moisture content of the final product, representing the average of a plurality of checks from which those showing unreasonable deviations have been discarded. Column IV shows the moisture increase; and column V shows the temperature drop during the evacuation.

It will be found that these results show a straight line curve fulfilled by the equation that the increase in moisture equals $1.6+0.695X$, where "X" is the surface moisture added. This assumes an approximate increase in temperature of 60° F. during steaming.

Increase in temperature of 60° F. during steaming.

| Initial moisture content | Surface moisture added | Final moisture content | Moisture increase during treatment | Temperature drop during preliminary evacuation |
|---|---|---|---|---|
| I | II | III | IV | V |
| Percent | Percent | Percent | Percent | Degrees |
| 9.29 | 2.89 | 12.75 | 3.46 | 4 |
| 9.29 | 2.89 | 12.95 | 3.66 | 4 |
| 9.29 | 2.86 | 12.95 | 3.66 | 4 |
| 9.34 | 3.3 | 13.14 | 3.80 | 4 |
| 9.34 | 4.00 | 13.90 | 4.56 | 1 |
| 9.4 | 4.00 | 13.65 | 4.25 | 4 |
| 9.36 | 4.05 | 13.70 | 4.34 | 4 |
| 9.4 | 4.00 | 13.85 | 4.45 | 8 |
| 9.35 | 4.03 | 13.80 | 4.45 | 8 |
| 9.32 | 4.00 | 13.7 | 4.38 | 12 |
| 9.33 | 4.00 | 13.65 | 4.32 | 12 |
| 9.37 | 5.00 | 14.50 | 5.13 | 4 |
| 9.40 | 5.00 | 14.48 | 5.08 | 4 |
| 9.28 | 5.19 | 14.80 | 5.52 | 4 |
| 9.42 | 6.0 | 15.0 | 5.58 | 4 |
| 9.32 | 6.0 | 15.0 | 5.68 | 4 |
| 9.4 | 6.0 | 15.25 | 5.85 | 4 |
| 9.39 | 6.82 | 15.5 | 6.11 | 4 |
| 9.39 | 6.82 | 15.55 | 6.16 | 4 |
| 9.35 | 7. | 15.85 | 6.50 | 4.5 |
| 9.34 | 7.44 | 16.44 | 7.10 | 4 |

For other temperature increases the curve is approximately the same, the 1.6 indicating the percentage of moisture added by an increase of 60° F. in temperature.

In carrying out the process, it has been found quite valuable in introducing the steam to continue the evacuation of gas from a point within the body of the material, and preferably near the bottom. Apparently, when the last traces of non-condensible gas are exhausted from the inner portions of the grain, a slight amount is left in the larger interstices of the product, and when the steam enters there is some tendency to pack this gas near the bottom of the container (if the steam is introduced from the top). The placing of an exhaust opening near the bottom of the apparatus and its use during the introduction of the steam removes any such traces of non-condensible gas.

The invention is applicable to organic products, and also to other products, but particularly to those of a porous nature. It is particularly applicable to grains, tobacco and other organic products which are likely to require the addition of moisture.

The use of steam at 160° F. and substantially at saturation, in a high vacuum results in some superheating of the steam.

The foregoing detailed description has been given for clearness of understanding only, and no unnecessary limitations should be understood therefrom, but the appended claims should be construed as broadly as permissible in view of the prior art.

I claim:

1. The method of treating grain which comprises adding a predetermined amount of water in a film on the grain, the amount being more than sufficient to supply vapor to scavenge non-condensible gas from the interstices of the grain, subjecting the grain to a high vacuum whereby substantially all non-condensible gas is removed therefrom, but leaving a substantial proportion of the film available for moistening the grain, and then introducing steam directly to the grain at a higher but subatmospheric pressure and at a higher temperature than the then temperature of the product, whereby liquid on the surface of the grain is transferred to the interior thereof to produce a predetermined moisture increase in the grain greater than that equivalent to the increase in temperature of the grain due to condensation of steam thereon.

2. The method as set forth in claim 1 in which the higher temperature and pressure produced by the steam are maintained for a substantial period of time.

3. The method as set forth in claim 1 in which the temperature of the grain is raised substantially entirely by condensation of the introduced steam.

4. The method as set forth in claim 1 in which the operation is carried out upon a mass of grain in bulk and evacuation is continued during at least a portion of the steaming operation in such manner as to strip any non-condensible gas therein from the product.

5. The method as set forth in claim 1 in which the grain is wheat.

6. The method as set forth in claim 1 in which the grain is corn.

7. The method of moistening grain in its normal dry condition which comprises adding from 1% to 8% of liquid water to the surface of the grain to produce a film of water thereon, removing substantially all non-condensible gas from the grain under a high vacuum, while leaving the film of water substantially unimpaired, and then heating the grain substantially entirely by condensation of steam thereon to raise the temperature thereof and increase the pressure thereon, whereby the water in the film is substantially entirely transferred from the exterior of the grain to the interior thereof and the moisture content of the grain is increased by a greater percentage than that equivalent to the increase in temperature due to condensation of steam thereon.

8. The method as set forth in claim 7 in which the moisture increase is approximately .695 times the amount of surface moisture added over that due to the condensation of steam on the product.

9. The method of treating a porous organic product which comprises adding a predetermined amount of water in a film on the product, the amount being more than sufficient to supply vapor to scavenge non-condensible gas from the interstices of the product, subjecting the product to a high vacuum whereby substantially all non-condensible gas is removed therefrom, but leaving a substantial proportion of the film available for moistening the product, and then introducing steam directly to the product at a higher but sub-atmospheric pressure and at a higher temperature than the then temperature of the product, whereby liquid on the surface of the product is transferred to the interior thereof to produce a predetermined moisture increase in the product greater than that equivalent to the increase in temperature of the product due to condensation of steam thereon.

10. The method as set forth in claim 9, in which the temperature of the product is raised substantially entirely by condensation of the introduced steam.

11. The method as set forth in claim 9, in which the product is tobacco.

JOHN M. BAER.